US012772920B2

(12) United States Patent
Brewer et al.

(10) Patent No.: US 12,772,920 B2
(45) Date of Patent: Oct. 27, 2026

(54) SYSTEMS AND METHODS FOR CALIBRATING OPERATION OF AN AGRICULTURAL VEHICLE

(71) Applicant: CNH Industrial America LLC, New Holland, PA (US)

(72) Inventors: Carl Brewer, New Holland, PA (US); Kevin Hanson, New Holland, PA (US); Jeffrey Fay, II, New Holland, PA (US); Ryan Gahres, New Holland, PA (US); Jason Musheno, New Holland, PA (US); Christopher Schulze, New Holland, PA (US); Neseth Kong, New Holland, PA (US); Tyler Smolko, New Holland, PA (US); Wyatt Gregory Brenneman, New Holland, PA (US); Jason Martin Wandersee, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 18/926,090

(22) Filed: Oct. 24, 2024

(65) Prior Publication Data

US 2025/0133979 A1 May 1, 2025

Related U.S. Application Data

(60) Provisional application No. 63/593,904, filed on Oct. 27, 2023.

(51) Int. Cl.
*A01B 69/04* (2006.01)

(52) U.S. Cl.
CPC .................................. *A01B 69/008* (2013.01)

(58) Field of Classification Search
CPC .................................................... A01B 69/008
See application file for complete search history.

(56) References Cited

U.S. PATENT DOCUMENTS 10,899,342 B1 * 1/2021 Brown ................ B62D 11/003
11,026,368 B2 6/2021 Fay, II et al.
(Continued)

FOREIGN PATENT DOCUMENTS

DE 102020118485 A1 * 1/2022 ............ B62D 6/002

OTHER PUBLICATIONS

Machine Translation of DE 102020118485 A1 PDF File Name: "DE102020118485A1_Machine_Translation.pdf" (Year: 2022).*

*Primary Examiner* — Grant Moubry
*Assistant Examiner* — Ruben Picon-Feliciano
(74) *Attorney, Agent, or Firm* — Foley & Lardner LLP

(57) ABSTRACT

A vehicle system for controlling operation of a vehicle includes one or more processing circuits configured to set a pre-calibrated value of a steering input device of the vehicle as a center value, the steering input device configured to receive an input from an operator to steer one or more tractive elements of the vehicle, monitor a precheck condition regarding an operational characteristic of the vehicle associated with a straight-line travel of the vehicle, control, in response to the precheck condition not being satisfied for a threshold time, an operation of the vehicle, and update, in response to the precheck condition being satisfied for the threshold time, the center value to be a current steering position value of the steering input device.

20 Claims, 4 Drawing Sheets

(56) References Cited

U.S. PATENT DOCUMENTS

| | | | | |
|---|---|---|---|---|
| 11,097,775 | B2 | 8/2021 | Fay | |
| 11,129,331 | B2 | 9/2021 | Young et al. | |
| 11,691,670 | B2 | 7/2023 | Fay | |
| 2016/0121924 | A1* | 5/2016 | Norstad ............... | B62D 5/0481 701/41 |
| 2018/0334186 | A1* | 11/2018 | Bebernes ............. | A01B 69/007 |
| 2022/0185246 | A1* | 6/2022 | Szuck .................... | G06N 20/00 |

* cited by examiner

SYSTEMS AND METHODS FOR CALIBRATING OPERATION OF AN AGRICULTURAL VEHICLE

CROSS-REFERENCE TO RELATED PATENT APPLICATION

This application claims the benefit of U.S. Provisional Patent Application No. 63/593,904, filed Oct. 27, 2023, which is incorporated herein by reference in its entirety.

BACKGROUND

The present disclosure relates generally to an agricultural vehicle. More specifically, the present disclosure relates to a steering control system for agricultural vehicles.

SUMMARY

One implementation of the present disclosure relates to a vehicle system for controlling operation of a vehicle. The vehicle system includes one or more processing circuits configured to set a pre-calibrated value of a steering input device of the vehicle as a center value, the steering input device configured to receive an input from an operator to steer at least one tractive element of the vehicle, monitor a precheck condition regarding an operational characteristic of the vehicle associated with a straight-line travel of the vehicle, control, in response to the precheck condition not being satisfied for a threshold time, an operation of the vehicle, and update, in response to the precheck condition being satisfied for the threshold time, the center value to be a current steering position value of the steering input device.

Another implementation of the present disclosure relates to a vehicle system. The vehicle system includes a vehicle and a control system. The vehicle includes a chassis, at least one tractive element coupled to the chassis, and a steering input device coupled with the at least one tractive element and configured to receive an input from an operator to facilitate steering the at least one tractive element. The control system is configured to set a pre-calibrated value of the steering input device as a center value, monitor a precheck condition regarding an operational characteristic of the vehicle associated with a straight-line travel of the vehicle, control, in response to the precheck condition not being satisfied for a threshold time, an operation of the vehicle, and update, in response to the precheck condition being satisfied for the threshold time, the center value to be a current steering position value of the steering input device.

Still another implementation of the present disclosure relates to a method for calibrating steering control of a vehicle. The method includes setting a pre-calibrated value of a steering input device of the vehicle as a center value, the steering input device configured to receive an input from an operator to steer at least one tractive element of the vehicle, monitoring a precheck condition regarding an operational characteristic of the vehicle associated with a straight-line travel of the vehicle, the precheck condition including (i) a curvature of the at least one tractive element of the vehicle and (ii) a steering angle of the steering input device, providing, in response the precheck condition not being satisfied for a threshold time, an indication of the precheck condition not being satisfied, limiting, in response to the precheck condition not being satisfied for the threshold time, operation of the vehicle to a speed below a threshold speed, and updating, in response to the precheck condition being satisfied for the threshold time, the center value to be a current steering position value of the steering input device. The precheck condition is satisfied when (i) the curvature is within a threshold curvature range and (ii) the steering angle is within a threshold steering angle range.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

The Disclosure Will Become More Fully Understood from the Following Detailed Description, Taken in Conjunction with the Accompanying Figures, Wherein Like Reference Numerals Refer to Like Elements, in which.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Overall Vehicle

Figure 1:
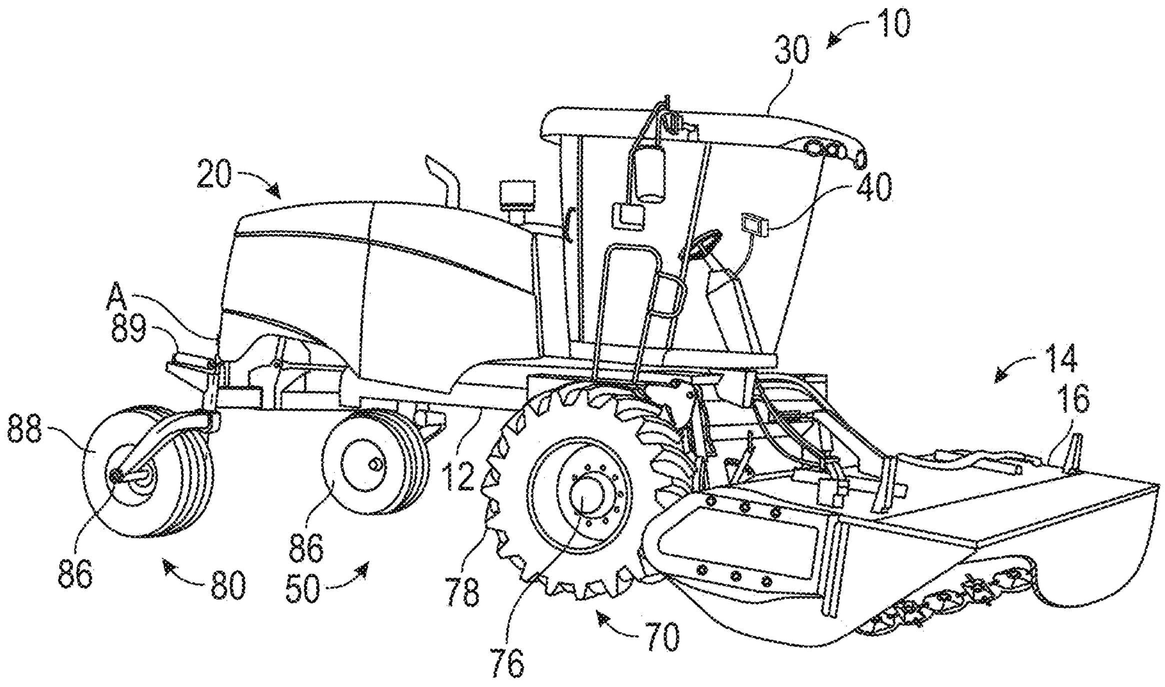
FIG. 1 is a perspective view of a vehicle, according to an exemplary embodiment.
Figure 2:
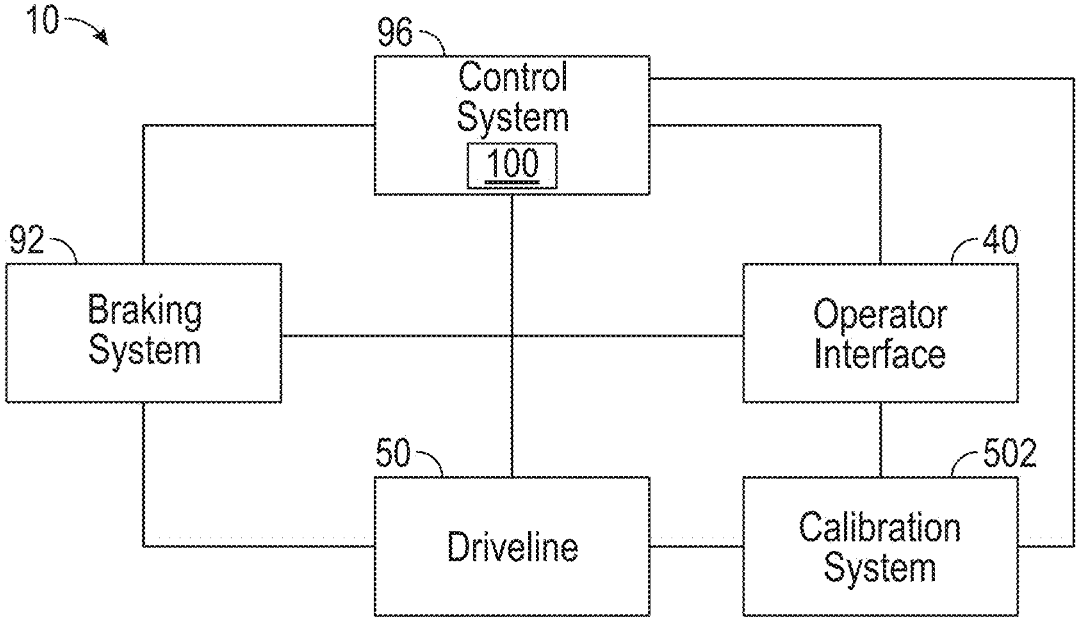
FIG. 2 is a schematic block diagram of the vehicle of FIG. 1, according to an exemplary embodiment.
Figure 3:
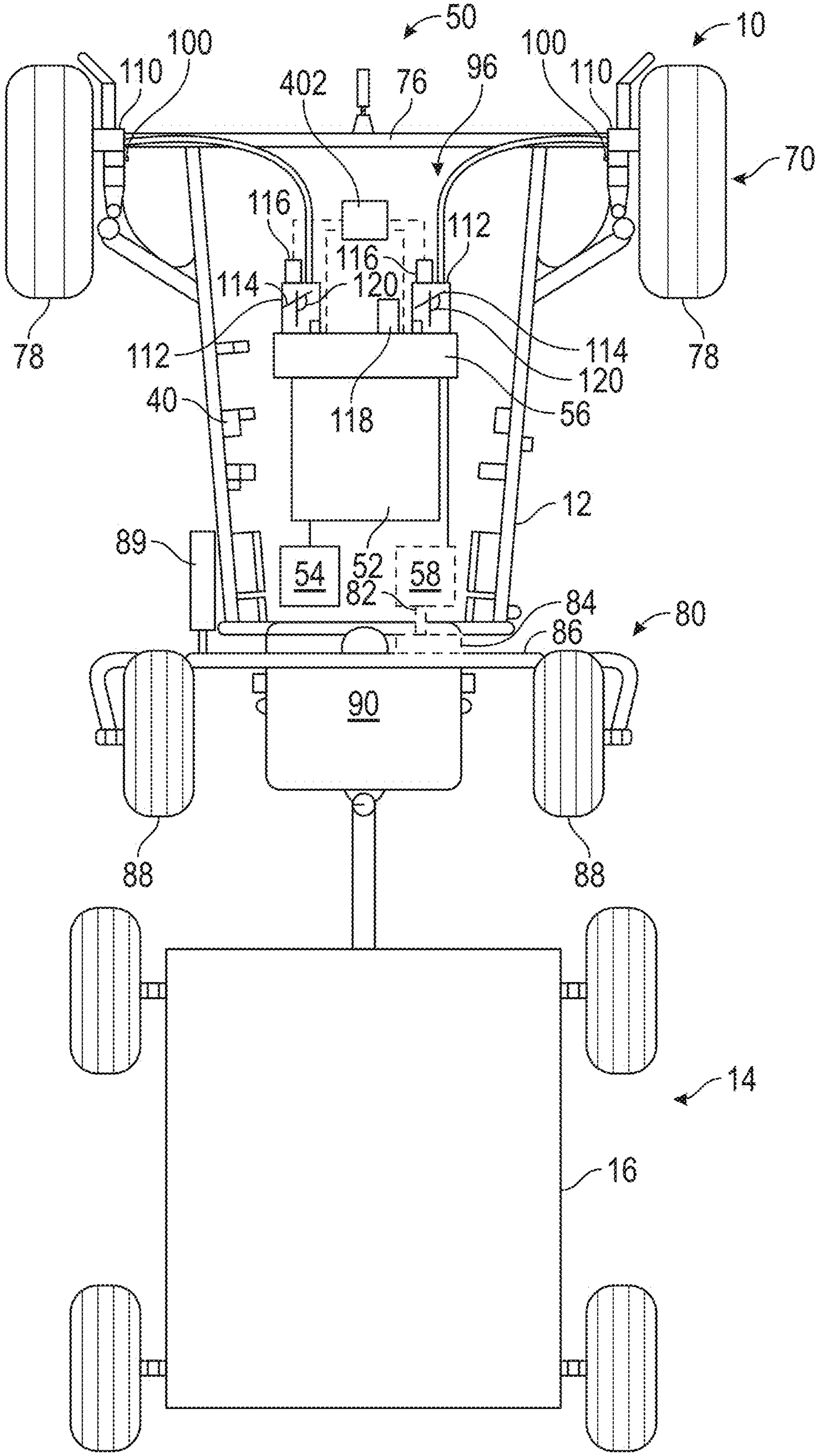
FIG. 3 is a plan view of a driveline of the vehicle of FIG. 1, according to an exemplary embodiment.

According to the exemplary embodiment shown in FIGS. 1-3, a machine or vehicle, shown as vehicle 10, includes a chassis, shown as frame 12; a body assembly, shown as body 20, coupled to the frame 12 and having an occupant portion or section, shown as cab 30; operator input and output devices, shown as operator interface 40, that are disposed within the cab 30; a drivetrain, shown as driveline 50, coupled to the frame 12 and at least partially disposed under the body 20; a vehicle braking system, shown as braking system 92, coupled to one or more components of the driveline 50 to facilitate selectively braking the one or more components of the driveline 50; and a vehicle control system, shown as control system 96, coupled to the operator interface 40, the driveline 50, and the braking system 92. In other embodiments, the vehicle 10 includes more or fewer components.

According to an exemplary embodiment, the vehicle 10 is an off-road machine or vehicle. In some embodiments, the off-road machine or vehicle is an agricultural machine or vehicle such as a windrower, a tractor, a telehandler, a front loader, a combine harvester, a grape harvester, a forage harvester, a sprayer vehicle, a speedrower, and/or another type of agricultural machine or vehicle. In some embodiments, the off-road machine or vehicle is a construction machine or vehicle such as a skid steer loader, an excavator, a backhoe loader, a wheel loader, a bulldozer, a telehandler, a motor grader, and/or another type of construction machine or vehicle. As shown in FIG. 1, the vehicle 10 includes an implement system 14 which may include one or more attached implements, shown as implements 16. In some embodiments, the vehicle 10 may additionally or alternatively include one or more trailed implements such as a front mounted mower, a rear mounted mower, a trailed mower, a tedder, a rake, a baler, a plough, a cultivator, a rotavator, a tiller, a harvester, and/or another type of attached implement or trailed implement. The implements 16 of implement system 14 may couple to the front or rear of vehicle 10 through various means, including, but not limited to, hydraulic hoses, electrical wires, PTO connection, three-point hitch, ball hitch, front forks, etc.

According to an exemplary embodiment, the cab 30 is configured to provide seating for an operator (e.g., a driver, etc.) of the vehicle 10. In some embodiments, the cab 30 is configured to provide seating for one or more passengers of the vehicle 10. According to an exemplary embodiment, the operator interface 40 is configured to provide an operator with the ability to control one or more functions of and/or provide commands to the vehicle 10 and the components thereof (e.g., turn on, turn off, drive, turn, brake, engage various operating modes, raise/lower an implement, etc.). The operator interface 40 may include one or more displays and one or more input devices. The one or more displays may be or include a touchscreen, an LCD display, an LED display, a speedometer, gauges, warning lights, etc. The one or more input device may be or include a steering wheel, a joystick, buttons, switches, knobs, levers, an accelerator pedal, an accelerator lever, a plurality of brake pedals, etc.

According to an exemplary embodiment, the driveline 50 is configured to propel the vehicle 10. As shown in FIG. 3, the driveline 50 includes a primary driver, shown as prime mover 52, and an energy storage device, shown as energy storage 54. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor and the energy storage 54 is a battery system. In some embodiments, the driveline 50 is a fuel cell electric driveline whereby the prime mover 52 is an electric motor and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system.

As shown in FIG. 3, the driveline 50 may include one or more of a transmission device (e.g., a gearbox, a continuous variable transmission ("CVT"), etc.), shown as transmission 56, coupled to the prime mover 52; a power divider, shown as transfer case 58, coupled to the transmission 56; a first tractive assembly, shown as front tractive assembly 70, coupled to a first output of the transfer case 58 (e.g., a front output); and a second tractive assembly, shown as rear tractive assembly 80, coupled to a second output of the transfer case 58 (e.g., a rear output). According to an exemplary embodiment, the transmission 56 has a variety of configurations (e.g., gear ratios, etc.) and provides different output speeds relative to a mechanical input received thereby from the prime mover 52. In some embodiments (e.g., in electric driveline configurations, in hybrid driveline configurations, etc.), the driveline 50 does not include the transmission 56. In such embodiments, the prime mover 52 may be directly coupled to the transfer case 58. According to an exemplary embodiment, the transfer case 58 is configured to facilitate driving both the front tractive assembly 70 and the rear tractive assembly 80 with the prime mover 52 to facilitate front and rear drive (e.g., an all-wheel-drive vehicle, a four-wheel-drive vehicle, a mechanical front-wheel drive, etc.). In some embodiments, the transfer case 58 facilitates selectively engaging rear drive only (e.g., such that the front tractive assembly 70 is passive and does not receive rotational energy from the prime mover 52), front drive only (e.g., such that the rear tractive assembly 80 is passive and does not receive rotational energy from the prime mover 52), and both front and rear drive simultaneously. In some embodiments, the driveline 50 does not include a rear differential 84 and/or the transfer case 58. In such embodiments, the vehicle 10 is propelled by the front tractive elements 78. In some embodiments, the transmission 56 and/or the transfer case 58 facilitate selectively disengaging the front tractive assembly 70 and the rear tractive assembly 80 from the prime mover 52 (e.g., to permit free movement of the front tractive assembly 70 and the rear tractive assembly 80 in a neutral mode of operation). In some embodiments, the driveline 50 does not include the transfer case 58. In such embodiments, the prime mover 52 or the transmission 56 may directly drive the front tractive assembly 70 (i.e., a front-wheel-drive vehicle) or the rear tractive assembly 80 (i.e., a rear-wheel-drive vehicle). In some embodiments, the driveline includes a mechanical front-wheel drive assembly ("MFWD") in which the prime mover 52 is mechanically coupled to an axle disposed between the front tractive elements 78. A mechanical front-wheel drive assembly may be used when the vehicle has rear tractive element 88 of a different size than the front tractive elements 78.

As shown in FIGS. 1 and 3, the front tractive assembly 70 includes a first drive shaft (e.g., a front drive shaft), coupled to the front output of the transfer case 58; a first differential (e.g., a front differential), coupled to the front drive shaft; a first axle, shown front axle 76, coupled to the front differential; and a first pair of tractive elements, shown as front tractive elements 78, coupled to the front axle 76. In some embodiments, the front tractive assembly 70 includes a plurality of front axles 76. In some embodiments, the front tractive assembly 70 does not include the front drive shaft or the front differential (e.g., a rear-wheel-drive vehicle). In some embodiments, the front drive shaft is directly coupled to the transmission 56 (e.g., in a front-wheel-drive vehicle, in embodiments where the driveline 50 does not include the transfer case 58, etc.) or the prime mover 52 (e.g., in a front-wheel-drive vehicle, in embodiments where the driveline 50 does not include the transfer case 58 or the transmission 56, etc.). The front axle 76 may include one or more components.

As shown in FIGS. 1 and 3, the rear tractive assembly 80 includes a second drive shaft, shown as rear drive shaft 82, coupled to the rear output of the transfer case 58; a second differential, shown as rear differential 84, coupled to the rear drive shaft 82; a second axle, shown rear axle 86, coupled to the rear differential 84; and a second pair of tractive elements, shown as rear tractive elements 88, coupled to the rear axle 86. In some embodiments, the rear tractive assembly 80 includes a plurality of rear axles 86. In some embodiments, the rear tractive assembly 80 does not include the rear drive shaft 82 or the rear differential 84 (e.g., a front-wheel-drive vehicle). In some embodiments, the rear drive shaft 82 is directly coupled to the transmission 56 (e.g., in a rear-wheel-drive vehicle, in embodiments where the driveline 50 does not include the transfer case 58, etc.) or the prime mover 52 (e.g., in a rear-wheel-drive vehicle, in embodiments where the driveline 50 does not include the transfer case 58 or the transmission 56, etc.). The rear axle 86 may include one or more components. According to the exemplary embodiment shown in FIG. 1, the front tractive elements 78 and the rear tractive elements 88 are structured as wheels. In other embodiments, the front tractive elements 78 and the rear tractive elements 88 are otherwise structured (e.g., tracks, etc.). In some embodiments, the front tractive elements 78 and the rear tractive elements 88 are both steerable. In other embodiments, only one of the front tractive elements 78 or the rear tractive elements 88 is steerable. In still other embodiments, both the front tractive elements 78 and the rear tractive elements 88 are fixed and not steerable.

In some embodiments, the rear tractive assembly 80 is a caster wheel assembly. In such embodiments, the caster wheel assembly includes a support structure configured to secure the caster wheels (e.g., rear tractive elements 88), a mounting plate configured to couple the support structure to the vehicle 10 (e.g., via the frame 12, etc.), a shaft configured to facilitate 360 degree rotational movement of the caster wheels, and any other component, about an axis of rotation, shown as axis A. In some embodiments, the axis A is substantially perpendicular to the ground surface with which the caster wheels are configured to engage. In some embodiments, one or more of the casters of the caster wheel assembly are operatively coupled to at least one actuator (e.g., the steering cylinder 89) to actively adjust the heading position (e.g., angle) of the actuated caster. In some embodiments, only one of the rear tractive elements 88 is actuated (e.g., the other rear tractive elements 88 are passively steered). In some embodiments, both rear tractive elements 88 are actuated. In some embodiments, the driveline 50 includes more or fewer than two rear tractive assemblies 80. In other embodiments, the front tractive assembly 70 is configured as a caster wheel assembly.

As shown in FIGS. 1 and 3, the driveline 50 includes a cylinder (e.g., an actuator, an arm, etc.), shown as steering cylinder 89, coupled to the rear tractive elements 88. The steering cylinder 89 is configured to facilitate turning the rear tractive elements 88 in response to a steering command received from a steering system of the vehicle 10. In some embodiments, the steering cylinder 89 is a hydraulic cylinder. In other embodiments, the steering cylinder 89 is a pneumatic cylinder. In still other embodiments, the steering cylinder 89 is another type of actuator positioned to steer the rear tractive elements 88 (e.g., a rotational actuator, another type of linear actuator, etc.). The steering cylinder 89 may be coupled to the frame 12 and include a steering arm coupled to the rear tractive elements 88. The steering cylinder 89 is configured to move the steering arm between an extended position and a retracted position to steer the rear tractive elements 88. By way of example, extending the steering arm applies a force laterally outward on the rear tractive elements 88 that turns the rear tractive elements 88 in a first direction (e.g., clockwise, counterclockwise, etc.). By way of further example, retracting the steering arm applies a force laterally inward on the rear tractive elements 88 that turns the rear tractive elements 88 in an opposing second direction (e.g., counterclockwise, clockwise, etc.). The steering cylinder 89 may facilitate rotating the rear tractive elements 88 360 degrees about the axis A. In some embodiments, the driveline 50 includes more or fewer than two steering cylinders 89 to control steering of the rear tractive assemblies 80. In some embodiments, in a first mode of operation (e.g., when traveling on a road), a first rear tractive element 88 is steered by the steering cylinder 89, and one or more second rear tractive elements 88 are not steered by the steering cylinder 89. In some embodiments, in a second mode of operation (e.g., when traveling off-road), the vehicle 10 adjusts its position through differential steering of the front tractive elements 88 (e.g., driving a first one of the front tractive elements 78 at a speed different than a second one of the front tractive elements 78). In some embodiments, the driveline 50 includes one or more steering cylinders 89 configured to steer the front tractive elements 78 of the front tractive assemblies 70.

In some embodiments, the driveline 50 includes a plurality of prime movers 52. By way of example, the driveline 50 may include a first prime mover 52 that drives the front tractive assembly 70 and a second prime mover 52 that drives the rear tractive assembly 80. By way of another example, the driveline 50 may include a first prime mover 52 that drives a first one of the front tractive elements 78, a second prime mover 52 that drives a second one of the front tractive elements 78, a third prime mover 52 that drives a first one of the rear tractive elements 88, and/or a fourth prime mover 52 that drives a second one of the rear tractive elements 88. By way of still another example, the driveline 50 may include a first prime mover that drives the front tractive assembly 70, a second prime mover 52 that drives a first one of the rear tractive elements 88, and a third prime mover 52 that drives a second one of the rear tractive elements 88. By way of yet another example, the driveline 50 may include a first prime mover that drives the rear tractive assembly 80, a second prime mover 52 that drives a first one of the front tractive elements 78, and a third prime mover 52 that drives a second one of the front tractive elements 78. In such embodiments, the driveline 50 may not include the transmission 56 or the transfer case 58.

According to an exemplary embodiment shown in FIG. 3, the driveline 50 additionally or alternatively includes one or more motors (e.g., electric motors, hydraulic motors, ground drive motor, etc.), shown as motors 110, coupled with the front tractive assembly 70 configured to drive the front tractive elements 78 (e.g., a ground drive wheel). In some embodiments, the driveline 50 includes a first motor 110 configured to drive a first one of the front tractive elements 78 and a second motor 110 configured to drive a second one of the front tractive elements 78 (e.g., independently of the first motor 110). The motors 110 may be driven by pumps (e.g., electric pumps, hydraulic pumps, etc.), shown as pumps 112 (e.g., a ground drive pump), operatively coupled with and driven by the prime mover 52. In some embodiments, the driveline 50 includes a first pump 112 configured to drive a first motor 110 and a second pump 112 configured to drive a second motor 110 (e.g., independently of the first pump 112). In some embodiments, a single motor 110 and/or a single pump 112 operate to drive the front tractive elements 78. As shown in FIG. 3, the driveline 50 may include one or more swashplates 114 configured to control an output (e.g., a pressure, a volumetric flow rate, etc.) of the pumps 112 by adjusting an angle of the swashplates 114. In some embodiments, the driveline 50 includes a first swashplate 114 configured to control a first pump 112 and a second swashplate 114 configured to control a second pump 112 (e.g., independently of the first swashplate 114). The angle of the swashplates 114 may be adjusted by actuators (e.g., electric actuators, hydraulic actuators, pneumatic actuators, etc.), shown as actuators 116, driven by actuator pumps 118 by the prime mover 52.

In some embodiments, the vehicle 10 is steered by adjusting swashplate angles 120 of the pumps 112. When the left and right swashplate angles 120 are equal and the pumps 112 are driven at the same speed, equal torque will be applied to the front tractive elements 78 (e.g., left and right front tractive elements 78) via respective motors 110. With the same rotational speed of the front tractive elements 78 about the front axle 76, the vehicle 10 travels along a straight line. The speed of vehicle 10 and/or the rotation of the front tractive elements 78 may be proportional to the swashplate angle 120, with greater swashplate angles 120 producing higher speeds. To steer the vehicle 10 to the left (e.g., as viewed in the top-view of vehicle 10 as illustrated in FIG. 3), the swashplate angles 120 are adjusted with respect to one another so that a first, right swashplate angle 120 is greater than a second, left swashplate angle 120. More hydraulic oil flows to a first, right motor 110 and thus more torque is applied to the front right tractive element 78 which causes the front right tractive element 78 to rotate faster than the front left tractive element 78 and vehicle 10 consequently turns to the left. To steer the vehicle 10 to the left (e.g., as viewed in FIG. 3), the swashplate angles 120 are adjusted with respect to one another so that the left swashplate angle 120 is greater than the right swashplate angle 120. More hydraulic oil flows to a second, left motor 110 and thus more torque is applied to the front left tractive element 78 which causes the front left tractive element 78 to rotate faster than the front right tractive element 78 and consequently vehicle 10 turns to the right. The turning radius of the vehicle 10 may be proportional to a difference between the rotational speed of the front tractive elements 78. At low speeds or field operation, the vehicle 10 may, in some embodiments, steer only with differential steering, as described above. However, in some embodiments, at high speeds or road operation, the vehicle 10 may alternatively or additionally employ one or more actively steered rear caster wheels (e.g., the rear tractive element 88) to match an angle of curvature that is commanded by the steering sensor and/or steering input (e.g., the steering input device 302 of FIG. 4), as described herein.

As shown in FIG. 3, the driveline 50 includes a power-take-off ("PTO"), shown as PTO 90. While the PTO 90 is shown as being an output of the transmission 56, in other embodiments the PTO 90 may be an output of the prime mover 52, the transmission 56, and/or the transfer case 58. According to an exemplary embodiment, the PTO 90 is configured to facilitate driving an attached implement 16 and/or a trailed implement 16 of the vehicle 10. In some embodiments, the driveline 50 includes a PTO clutch positioned to selectively decouple the driveline 50 from the attached implement 16 and/or the trailed implement 16 of the vehicle 10 (e.g., so that the attached implement 16 and/or the trailed implement 16 is only operated when desired, etc.).

According to an exemplary embodiment, the braking system 92 includes one or more brakes (e.g., disc brakes, drum brakes, in-board brakes, axle brakes, etc.) positioned to facilitate selectively braking (i) one or more components of the driveline 50 and/or (ii) one or more components of a trailed implement. In some embodiments, the one or more brakes include (i) one or more front brakes positioned to facilitate braking one or more components of the front tractive assembly 70 and (ii) one or more rear brakes positioned to facilitate braking one or more components of the rear tractive assembly 80. In some embodiments, the one or more brakes include only the one or more front brakes. In some embodiments, the one or more brakes include only the one or more rear brakes. In some embodiments, the one or more front brakes include two front brakes, one positioned to facilitate braking each of the front tractive elements 78. In some embodiments, the one or more front brakes include at least one front brake positioned to facilitate braking the front axle 76. In some embodiments, the one or more rear brakes include two rear brakes, one positioned to facilitate braking each of the rear tractive elements 88. In some embodiments, the one or more rear brakes include at least one rear brake positioned to facilitate braking the rear axle 86. Accordingly, the braking system 92 may include one or more brakes to facilitate braking the front axle 76, the front tractive elements 78, the rear axle 86, and/or the rear tractive elements 88. In some embodiments, the one or more brakes additionally include one or more trailer brakes of a trailed implement attached to the vehicle 10. The trailer brakes are positioned to facilitate selectively braking one or more axles and/or one more tractive elements (e.g., wheels, etc.) of the trailed implement.

Referring to FIG. 2, the vehicle 10 may include or be a component of the control system 96. The control system 96 may include a controller, one or more sensors 100 (e.g., speed sensors, cameras, imaging devices, angle sensors, tractive element position sensors, tractive element curvature sensors, infrared sensors, etc.), a Global Positioning System ("GPS"), the driveline 50, etc. The control system 96 is configured to receive and transmit signals relating to operation of the vehicle 10 and the various components and/or systems of the vehicle 10. By way of example, the control system 96 is communicably coupled with the operator interface 40, the driveline 50, and the braking system 92. The controller of the control system 96 is configured to receive sensor data from the sensors 100 and a GPS location from the GPS. The one or more sensors 100 may be coupled to one or more different components (e.g., the transmission 56, the front tractive assembly 70, the rear tractive assembly 80, the steering cylinder 89, etc.) or systems (e.g., braking system 92, steering control system 400, etc.) of the vehicle 10 and configured to capture data relating to the operation (e.g., condition, performance, status, etc.) of the one or more different components of systems of the vehicle 10. The controller of the control system 96 may use the sensor data to autonomously control operation of the driveline 50, the braking system 92, any/or any other component of the vehicle 10. The controller of the control system 96 may also receive feedback from the driveline 50. The controller may communicate with a remote system (e.g., remote system 412) via a transceiver, providing the sensor data, the GPS location, and the feedback from the driveline 50. The operator interface 40 may provide various buttons, input devices, steering wheels, selectors, switches, etc., to obtain an input or requested command for the vehicle 10 from an operator. In some embodiments, the command is a direct command to operate the driveline 50 or the braking system 92 such that the vehicle 10 is remotely controlled. In some embodiments, the command is a high level command to the vehicle 10 to implement one or more actions such that the vehicle 10 is semi-autonomously controlled.

The controller may also provide any of the sensor data obtained from the sensors 100 (e.g., speed data, angle data, curvature data, image data, IR data, FUR data, radar data, communications, etc.) to the remote system via the transceiver. The remote system may include a graphical user interface configured to display any of the sensor data, GPS location, or feedback provided to the remote system by the controller of the control system 96. In some embodiments, a transceiver of the vehicle 10 is configured to communicate with transceivers of nearby vehicles 10 to form a mesh network. The controller may receive commands from the remote system and operate the driveline 50 and the braking system 92 to implement the commands.

Calibration System

Steering System

Figure 4:
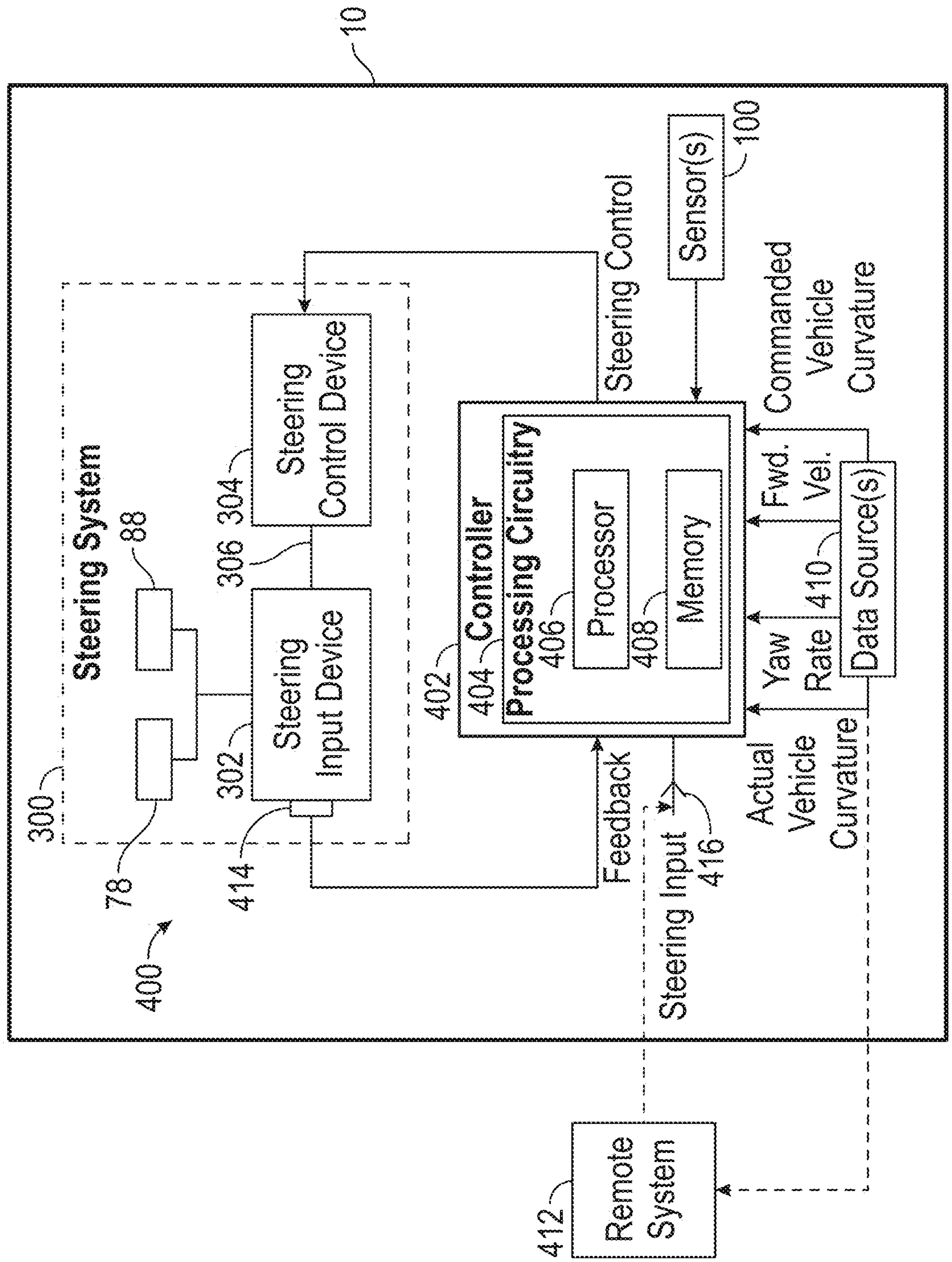
FIG. 4 is a block diagram of a control system for controlling steering of the vehicle of FIG. 1, according to an exemplary embodiment.

Referring to FIG. 4, the vehicle 10 includes a steering control system 400 for a steering system 300. The steering system 300 is operable to adjust an orientation of (e.g., is configured to facilitate steering) one or more tractive elements and/or one or more pairs of tractive elements (e.g., front tractive elements 78, rear tractive elements 88, etc.), and/or operable to adjust a heading of the vehicle 10. In some embodiments, the steering system 300 is configured to adjust an orientation of the front tractive elements 78 to steer the vehicle 10. As shown in FIG. 4, the steering system 300 includes a steering input device 302 (e.g., a steering wheel, a rotatable control device, a steering device, a steering input device, a joystick, etc.) and a steering control device 304 (e.g., a steering control system, a steering cylinder, etc.).

Referring to FIG. 4, a steering condition 306 (e.g., an angle of the steering wheel, a position of the steering input device 302, etc.) of the steering input device 302 may be adjusted in order to adjust the orientation of the one or more pairs of tractive elements to complete a turn. By way of example, an operator may provide an input to the steering input device 302, such as a steering wheel, to change the steering condition 306. By way of another example, the operator may provide an input to the steering input device 302 to drive the front tractive elements 78 at different speeds to turn the vehicle 10 and change the steering condition 306. The steering input device 302 may be operably coupled with one or more steering components such as the steering cylinder 89, hydraulic components, rack and pinions, etc., in order to turn one or more of the front tractive elements 78, turn one or more rear tractive elements 88, and/or cause the front tractive elements 78 to operate (e.g., rotate) at different speeds in order to steer the vehicle 10. In some embodiments, the method of steering the vehicle 10 (e.g., adjusting the speeds of the front tractive elements 78, turning one or more rear tractive elements 88, etc.) may depend on the terrain, speed of the vehicle 10, and/or other operating parameters of the vehicle 10. For example, when the vehicle 10 is traveling at low speeds and/or traversing uneven ground (e.g., a field), the vehicle 10 may execute a steering operation through differential steering (e.g., adjusting the speed of one or more motors 110 to rotate the front tractive elements 88 at different speeds). In other embodiments, when the vehicle 10 is traveling at high speeds and/or on an even surface (e.g., a road), the vehicle 10 may execute the steering operation through actuation of the steering cylinder 89 to adjust an orientation of one or more caster wheels (e.g., the rear tractive element 88) and/or adjusting the speed and/or angle of steering of the rear tractive elements 88. In some embodiments, the vehicle 10 changes steering methods based on a selected operation mode (e.g., a transport mode, a field mode, etc.). The steering control device 304 may include hydraulic actuators (e.g., a rack and pinion system), linear electric actuators, pneumatic actuators, hydraulic motors, etc., configured to use a steering control to adjust the steering condition 306 of the steering input device 302 in order to adjust the orientation of the one or more pairs of tractive elements to perform a turn. In some embodiments, the steering control device 304 is an electric motor or electric transducer configured to receive the steering control and adjust the steering condition 306 of the steering input device 302 in order to adjust the orientation of the one or more pairs of tractive elements. In some embodiments, the steering control device 304 is the steering cylinder 89. The steering control device 304 may be operably coupled with the steering input device 302 such that the steering control device 304 implements the steering control to adjust the steering condition 306 of the steering input device 302 by adjusting an orientation, an angle, a position, etc., of the steering input device 302. In some embodiments, the steering control device 304 includes one or more motors (e.g., prime movers 52, motors 110, etc.) configured to drive the front tractive elements 78 of the front tractive assemblies 70 and/or drive the rear tractive elements 88 of the rear tractive assemblies 80 at different speeds to facilitate turning the vehicle 10 (e.g., differential steering). By way of example, the steering control device 304 may include a first motor 110 configured to drive a first one of the front tractive elements 78 and a second motor 110 configured to drive a second one of the front tractive elements 78 (e.g., independently drive the first one of the front tractive elements 78 and the second one of the front tractive elements 78) to turn the vehicle 10. In such an example, a passive rear caster wheel (e.g., a rear tractive element 88) may rotate about the axis A as the vehicle 10 turns without being actuated (e.g., by the steering cylinder 89, by the steering control device 304, etc.).

In some embodiments, a relationship between adjusting the steering condition 306 of the steering input device 302 and adjusting the orientation of the one or more of the front tractive elements 78 or the rear tractive elements 88 to steer the vehicle 10 is non-linear (e.g., the adjustment of the one or more of the front tractive elements 78 or the rear tractive elements 88 is not proportional to the adjustment of the steering condition 306 of the steering input device 302, etc.). For example, as the steering condition 306 of the steering input device 302 is adjusted further away from a center steering position (e.g., a position of the steering input device 302 that results in the vehicle 10 driving straight, etc.), the front tractive elements 78 or the rear tractive elements 88 may turn at a decreasing rate.

In some embodiments, the steering input device 302 is moved (e.g., rotated, positioned) at a steering condition 306 that is outside of an operational steering condition range that corresponds with a maximum orientation of the one or more of the front tractive elements 78 or the rear tractive elements 88 to steer the vehicle 10, such that an input to the steering input device 302 when the steering condition 306 of the steering input device 302 is outside of the operational steering condition range does not adjust (e.g., move, rotate, turn, etc.) the heading of the vehicle 10 (e.g., the orientation of the one or more of the front tractive elements 78 or the rear tractive elements 88, the different rotational speeds of the front tractive elements 78, etc.). For example, the steering condition 306 of the steering input device 302 could continue to be adjusted beyond a steering condition 306 associated with a maximum orientation (e.g., a maximum turn actuation, a position in which the rear tractive elements 88 can no longer rotate in a respective direction, etc.) of the rear tractive elements 88.

The steering control system 400 includes a controller 402 in communication with the steering system 300 and configured to control operation of the steering system 300. Referring to FIG. 4, the controller 402 includes a circuit, shown as processing circuitry 404, a processor, shown as processor 406, and memory, shown as memory 408, according to an exemplary embodiment. The controller 402 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. According to the exemplary embodiment shown in FIG. 4, controller 402 includes the processing circuitry 404 and memory 408. Processing circuitry 404 may include an ASIC, one or more FPGAs, a DSP, circuits containing one or more processing components, circuitry for supporting a microprocessor, a group of processing components, or other suitable electronic processing components. In some embodiments, processing circuitry 404 is configured to execute computer code stored in memory 408 to facilitate the activities described herein. Memory 408 may be any volatile or non-volatile computer-readable storage medium capable of storing data or computer code relating to the activities described herein. According to an exemplary embodiment, memory 408 includes computer code modules (e.g., executable code, object code, source code, script code, machine code, etc.) configured for execution by processing circuitry 404. In some embodiments, controller 402 may represent a collection of processing devices (e.g., servers, data centers, etc.). In such cases, processing circuitry 404 represents the collective processors of the devices, and memory 408 represents the collective storage devices of the devices.

In some embodiments, the controller 402 is configured to receive a steering input 416 from a remote system 412 (e.g., a remote operating system, etc.) or an operator and provide the steering control to the steering control device 304. The steering input 416 indicates at least one of a desired degree, a desired radius, or a desired rate of turn, or may indicate a commanded heading (e.g., curvature) of the vehicle 10. In some embodiments, the steering input 416 corresponds to a turn that the vehicle 10 should perform. In some embodiments, the steering input 416 corresponds to a command to provide the steering control to the steering control device 304 such that the vehicle 10 travels substantially straight (e.g., ±5° from straight, ±10° from straight, etc.). In some embodiments, the controller 402 may receive sensor inputs from a sensor that corresponds with the steering input device 302. In some embodiments, the sensor inputs may be encoder values (e.g., encoder position, encoder feedback, encoder signals, etc.) from an encoder 414 that is configured to detect a position, rate of change, etc., of the steering input device 302. In some embodiments, the encoder 414 is a sensor that is provided as a component of the steering control device 304. In such embodiments, the encoder 414 may acquire data indicative of the angular velocity (e.g., a rotational drive speed) of the front tractive elements 78 or the rear tractive elements 88 to determine a steered angle of the vehicle 10. In some embodiments, the controller 402 receives sensor data from the one or more sensors 100 relating to the operation of one or more components or systems of the vehicle 10. By way of example, the sensors 100 may transmit a signal to the controller 402 relating to the speed of the vehicle 10, the angular velocity (e.g., a rotational drive speed) of the front tractive elements 78 or the rear tractive elements 88, and/or any other information relating to the driveline 50 or the braking system 92.

In some embodiments, the sensors 100 provide environmental data relating to the surrounding area of the vehicle 10 to the controller 402. By way of example, the environmental data may provide an indication to the controller 402 that the vehicle 10 is traveling along a road. In such an example, the controller 402 may be configured to, based on the data acquired by the sensors 100, control the vehicle 10 in a transport mode (e.g., a first mode of operation, etc.). In the transport mode, the controller 402 may permit unrestricted operation of the vehicle 10 (e.g., facilitate normal or unrestricted operation of the operator interface 40, the driveline 50, the braking system 92, or any other component of the vehicle 10, permit the vehicle 10 to travel at a maximum speed thereof etc.). By way of another example, the controller 402 may determine, based on the data acquired by the sensors 100, that the vehicle 10 is traveling in a field (e.g., plowing, based on uneven terrain, traveling at lower speeds, etc.), and, based on the determination, limit operation of the vehicle 10 in a field mode (e.g., a second mode of operation, etc.). In the field mode, the controller 402 may limit operation (e.g., limit operation of the vehicle 10 in a second mode of operation) of the operator interface 40, the driveline 50, the braking system 92, and/or any other component of the vehicle 10. By way of example, the controller 402 may limit operation of the prime mover 52 such that the vehicle 10 cannot exceed a threshold speed (e.g., 5 miles per hour, 2 miles per hour, etc.) and/or any other control to limit operation of the vehicle 10. In some embodiments, when the vehicle 10 is in the field mode, the controller 402 is configured to steer the vehicle 10 using differential steering techniques described in greater detail above. In some embodiments, when the vehicle 10 is in the transport mode, the controller 402 is configured to steer the vehicle 10 by actuating the steering cylinder 89 coupled to a rear caster wheel as described in greater detail above. The controller 402 may be configured to provide an indication (e.g., play a sound or message, display a warning message, illuminate one or more lights, etc. via the operator interface 40) to the operator that the vehicle 10 is operating in the transport mode or in the field mode.

Figure 5:
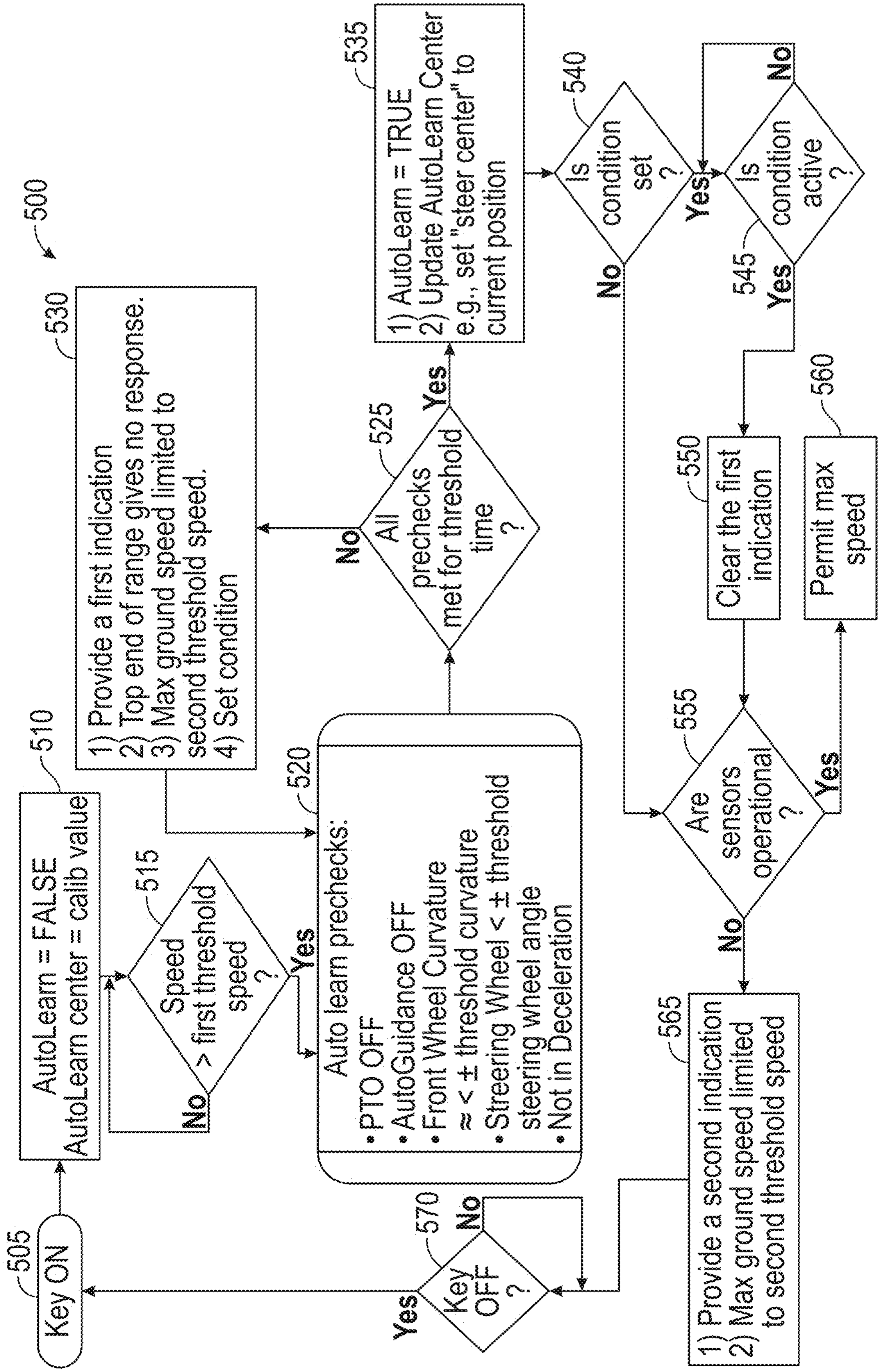
FIG. 5 is a flow diagram of a process for calibrating a steering input device of the vehicle of FIG. 1, according to an exemplary embodiment.

It should be understood that any of the functionality, autonomous controls, model training techniques, calibration techniques, controls, etc., of the controller 402 as described herein with reference to FIGS. 4-5 may be performed by the control system 96, the remote system 412 or the calibration system 502. The control system 96 or the remote system 412 may be similar to the controller 402 including processing circuitry, processors, memory, etc. In some embodiments, the control system 96, the remote system 412, and the controller 402 are communicably coupled with each other via a telematics unit (e.g., a transceiver, a wireless transmitter, a radio, a cellular dongle, etc.) of the vehicle 10. In some embodiments, the steering input device 302 is operably coupled via components of the steering system 300 similar to or the same as described in U.S. Pat. No. 11,129,331, filed Jan. 4, 2019, the entire disclosure of which is incorporated by reference herein.

Straight-Line Calibration

Referring to FIG. 5, a flow diagram is shown illustrating an exemplary embodiment of executing a calibration method 500 for a straight-line operation of the vehicle 10. Execution of the calibration method 500 calibrates a straight-line operation of the steering control device 304. The calibration method 500 may be performed automatically when the vehicle 10 is operating in the transport mode (e.g., traveling along a road, responsive to the controller 402 transitioning the mode of operation of the vehicle 10 to the transport mode, etc.). In some embodiments, the calibration method 500 is performed in response to an input provided by the operator (e.g., via the operator interface 40) to initiate the calibration method 500. In other embodiments, the calibration method 500 is performed when the vehicle 10 is operating in the field mode (e.g., responsive to the controller 402 transitioning the mode of operation of the vehicle 10 to the field mode). In some embodiments, the calibration method 500 is automatically performed when the vehicle 10 is traveling at a speed that is greater than a predetermined speed threshold. In still other embodiments, the control system 96, the steering system 300, and/or the remote system 412 determines, based on data received from the sensors 100, the encoder 414, the data sources 410, etc., that the vehicle 10 is not tracking straight (e.g., not traveling straight when the position of the steering input device 302 indicates that the vehicle 10 should be traveling straight, not traveling straight when the steering condition 306 is set to a value corresponding to straight-line travel, etc.) and automatically initiates the calibration method 500 to re-calibrate the components of the steering system 300 (e.g., the steering cylinder 89, the steering input device 302, the steering control device 304, etc.). The calibration method 500 provides for a method to compensate for tolerance stack-up within the mechanical assembly of the driveline, including the rear tractive element 88 (e.g., a steered caster). The calibration method 500 may be used to provide an actual and accurate mapping of the steering input position to the actual steering of the vehicle 10. In at least one embodiment, the calibration method 500 is used to calibrate a mapping of a center position of a steering input device 302 to a steering control device 304.

As described in greater detail herein, the calibration method 500 monitors a steering sensor position, ground drive wheel speed, and steering cylinder position. In at least on implementation of the calibration method 500, the vehicle 10 must travel "straight" forward (e.g., driven with the user input set to straight) for a minimum distance above and below threshold speeds. During this "straight" travel, the steering system 300 captures, from one or more sensors, one or more operating parameters of the vehicle 10. For example, the steering system 300 may capture a position (e.g., extension) of the steering cylinder 89. This position is compared to a predetermined (e.g., factory-set) "center" position. If the position of the steering cylinder 89 is within a tolerance of the predetermined "center" position setting, the system determines that this is "actual" straight operation and will command the steering angle of the steered caster to match the curvature of the ground drive wheels based on speed differential.

The calibration method 500 for calibrating a steering control device of an agricultural vehicle includes steps 505-570, according to some embodiments. In some embodiments, one or more steps of the calibration method 500 are performed by the controller 402 based on data obtained from one or more data sources 410 (shown in FIG. 4) of the vehicle 10, sensor data obtained from the one or more sensors 100, the feedback from the steering system 300, and/or an input from an operator. In some embodiments, the data sources 410 as shown in FIG. 4 include sensors, systems, sub-systems, etc., of the vehicle 10. In some embodiments, the calibration method 500 is executed by any combination of one or more controllers or other suitable devices, such as a separate controller communicably coupled with the controller 402, or any other suitable system. In some embodiments, the vehicle 10 includes a calibration system 502 (as shown in FIG. 2) configured to perform the steps of the calibration method 500.

In some embodiments, the steering control device 304 is pre-calibrated (e.g., by a manufacturer). The pre-calibration may be performed by rotating the front tractive assemblies 70 and/or the rear tractive assemblies 80 (e.g., rotating the front tractive assemblies 70 or the rear tractive assemblies 80 configured as caster wheels 360 degrees, 180 degrees, 90 degrees, etc. about an axis of rotation perpendicular to a ground surface with which the caster wheels are configured to engage) and recording the behavior of the steering control device 304. By way of example, pre-calibration may include recording the parameters (e.g., extension distance, retraction distance, lateral force, etc.) of the steering control device 304 (e.g., the steering cylinder 89, etc.) when the steering control device 304 is actuated to a maximum extension distance and minimum extension distance. Based on the recorded minimum and maximum extension distances, a calculation may be performed by the controller 402 to determine a nominal straight position of the steering control device 304 (e.g., a position of the arm of the steering cylinder 89 at which the vehicle 10 would travel in a substantially straight direction). The nominal straight position may be a calibration value (shown in FIG. 5 as "calib value") that is a baseline calibration value for comparison during an active calibration performed during the calibration method 500. By way of example, during active calibration of the calibration method 500, a current position (e.g., an operation of the steering control device 304 when the vehicle 10 is traveling straight) may be determined and compared with the baseline calibration value. Deviations from the baseline calibration value can be detected as faults and corrected, helping to maintain the accuracy of the steering system 300. The baseline calibration value and any data, command, value, etc. determined during the calibration method 500 may be stored by the memory 408. In some embodiments, the pre-calibration is performed by a manufacturer of vehicle 10. In other embodiments, the pre-calibration is performed by an operator of the vehicle 10 (e.g., when the vehicle 10 is not in operation, prior to initiating the calibration method 500, upon noticing that the vehicle 10 is not tracking straight, etc.).

At step 505, the controller 402 is configured to determine whether a key of the vehicle 10 is ON. In some embodiments, step 505 is performed by the controller 402 based on data from one or more systems or components of the vehicle 10 relating to an indication that the vehicle 10 is operating (e.g., traveling, moving, etc.). By way of example, the key may be ON when the prime mover 52 is in operation (e.g., the internal combustion engine is running). In some embodiments, the driveline 50 is configured to provide a signal to the controller 402 relating to an indication that the key is ON. In some embodiments, the controller 402 receives a signal from any other system or component of the vehicle 10 relating to an indication that the key is ON.

At step 510, the controller 402 sets an auto learn sequence as false and sets an auto learn center value as the baseline calibration value. The auto learn sequence, as described in greater detail below with respect to step 535, may be an automatic learning process of the straight-line operation of the vehicle 10 to calibrate straight-line operation of the steering control device 304. By way of example, the controller 402 may be configured to determine whether the auto learn sequence is being initiated (e.g., executed, "TRUE", etc.). By way of another example, at step 510, the controller 402 may, upon a determination that the auto learn sequence is being initiated, stop the auto learn sequence (e.g., set the auto learn sequence to "FALSE"). In some embodiments, the auto learn center value is a value relating to a condition (e.g., state, position, etc.) of the steering control device 304 determined, during pre-calibration, to provide straight steering to the front tractive assemblies 70 or the rear tractive assemblies 80. The auto learn center value may be compared to a current position of the steering control device 304 determined during active calibration of the steering control device 304 during the calibration method 500. In some embodiments, the controller 402 sets the auto learn center value as the baseline calibration value.

At step 515, the controller 402 is configured to receive sensor data from the one or more sensors 100 relating to a current speed of the vehicle 10 and compare the current speed with a first threshold speed. By way of example, the sensors 100 may include wheel speed sensors configured to calculate a speed of the vehicle 10 by recording the number of revolutions of the front tractive elements 78 or rear tractive elements 88 over a predetermined time. By way of another example, the controller 402 may receive data from a radar sensor, a lidar sensor, an accelerometer, an odometer sensor, and/or any other component to determine the current speed of the vehicle 10. In some embodiments, the controller 402 may utilize GPS data from the GPS to determine the current speed of the vehicle 10 by tracking its position over time. The first threshold speed may be 15 miles per hour ("mph") such that, at step 515, the controller 402 determines whether the vehicle 10 is traveling over 15 mph. In some embodiments, the first threshold speed is greater or less than 15 mph (e.g., 14 mph, 10 mph, 16 mph, 18 mph, 20 mph, etc.). If the controller 402 determines that the vehicle 10 is traveling faster than the first threshold speed (e.g., the current speed is greater than the first threshold speed), the calibration method 500 continues to step 520. If the controller 402 determines that the vehicle 10 is traveling equal to or slower than the first threshold speed (e.g., the current speed is the same or less than the first threshold speed), the calibration method 500 repeats step 515. In some embodiments, the controller 402 is configured to (i) shift the vehicle 10 into neutral (e.g., such that no power is transmitted to the prime mover 52) and/or (ii) operate the braking system 92 to slow the vehicle 10 until the vehicle 10 is operating at or below the first threshold speed.

At step 520, the controller 402 checks (e.g., monitors, records, etc.) a series of precheck conditions (e.g., parameters, values, etc.) relating to the operation of the vehicle 10 (e.g., operational characteristic, performance of the steering system 300, condition of the driveline 50, etc.). As shown, the series of conditions is labeled as auto learn prechecks in FIG. 5. The auto learn prechecks (e.g., the precheck conditions) may include one or more conditions relating to the operation of the vehicle 10. By way of example, a first auto learn precheck (e.g., a first precheck condition) may include whether the PTO 90 is OFF (e.g., a PTO status is not active, the PTO 90 is disengaged, not receiving output from the prime mover 52, the transmission 56, and/or the transfer case 58, etc.). A second auto learn precheck (e.g., a second precheck condition) may include whether an auto guidance system (e.g., an autonomous steering system, etc.) is OFF (e.g., an autonomous guidance status). By way of example, when the auto guidance system is OFF, the vehicle 10 is manually controlled by an operator such that the operator provides steering input to the steering input device 302 to control a heading of the vehicle 10 (e.g., an actual steered angle and/or speed of the front tractive elements 78 or the steered angle of one or more of the rear tractive elements 88. In some embodiments, the input from the operator varies the rotational speed of the front tractive elements 78. Satisfying the second auto learn precheck may ensure that the operator is actively controlling the heading of the vehicle 10 or the actual steered angle and/or speed of the front tractive elements 78 or the steered angle of one or more of the rear tractive elements 88 (e.g., as opposed to the controller 402 facilitating autonomous control of steering the vehicle 10). A third auto learn precheck (e.g., a third precheck condition) may include whether the curvature of the front tractive elements 78 or the rear tractive elements 88 or a heading of the vehicle 10 is within a threshold curvature range from zero curvature (e.g., about less than and greater than a threshold curvature from a curvature when the front tractive elements 78 or the rear tractive elements 88 are straight). In some embodiments, the threshold curvature range is ±5% from zero curvature (e.g., about less than 5% and about greater than −5%). In other embodiments, the threshold curvature range is less than or greater than ±5% (e.g., ±1%, ±2%, ±3%, ±4%, ±6%, ±7%, ±8%, ±9%, ±10%, etc.). In some embodiments, the curvature and/or speed of the front tractive elements 78 or the steering of the rear tractive elements 88 includes a steered angle of the front tractive elements 78 or the rear tractive elements 88 relative to the frame 12 (e.g., relative to the angle of the front tractive elements 78 or the rear tractive elements 88 when the vehicle 10 is travelling straight). In some embodiments, the controller 402 receives sensor data from one or more sensors 100 relating to the rotation per minute of the front tractive elements 78 or the rear tractive elements 88 to determine the curvature of the vehicle 10. By way of example, if a left front tractive element 78 is rotating faster than a right front tractive element 78, the controller 402 may determine that the vehicle 10 is turning right and may determine the curvature of the turn. Satisfying the third auto learn precheck may ensure that the vehicle 10 is traveling in a substantially straight forward direction. In some embodiments, the controller 402 is configured to determine the curvature using a different method (e.g., monitoring an actual steered angle and/or speed of the front tractive elements 78 and/or the steered angle of one or more of the rear tractive elements 88, monitoring an extension distance of the steering control device 304, the steering cylinder 89, etc.). A fourth auto learn precheck (e.g., a fourth precheck condition) may include whether the steering angle of the steering input device 302 (e.g., the steering condition 306 of the steering wheel) is within a threshold steering angle range from straight (e.g., within a threshold steering angle range from a steering angle when the steering input device 302 is not rotated, no steering wheel input angle, etc.). Satisfying the fourth auto learn precheck may ensure that the operator is providing an input to the steering input device 302 associated with straight forward travel. In some embodiments, the threshold steering angle range is ±5% from straight (e.g., about less than 5% and about greater than −5%). In other embodiments, the threshold steering angle range is less than or greater than ±5% (e.g., ±1%, ±2%, ±3%, ±4%, ±6%, ±7%, ±8%, ±9%, ±10%, etc.). In some embodiments, the controller 402 is configured to determine the steering angle based on data acquired from a sensor coupled with the steering input device 302 and configured to monitor the steering condition 306. A fifth auto learn precheck (e.g., a fifth precheck condition) may include a deceleration status indicative of whether the vehicle 10 is not in deceleration (e.g., the speed of the vehicle 10 not slowing down). The controller 402 may determine whether the vehicle 10 is not in deceleration by receiving data relating to the speed of the vehicle 10 from the one or more sensors 100. Satisfying the fifth auto learn precheck may ensure that the operator is not actively providing an input to the braking system 92 to slow the vehicle 10.

In some embodiments, step 520 includes more or fewer than five auto learn prechecks. In some embodiments, step 520 includes auto learn prechecks that are different from the auto learn prechecks described above. By way of example, auto learn prechecks may include whether the transmission 56 is in a specific gear, and/or any one or more other parameters relating to the operation of the vehicle 10. By way of another example, an auto learn precheck may include whether the steering cylinder 89 position is within a predetermined range (e.g., ±50 mV, ±100 mV, ±200 mV, etc.) of the pre-calibrated value of the steering control device 304 as discussed above.

At step 525, the controller 402 determines whether all of the auto learn prechecks are met (e.g., satisfied, within a predetermined range, below a predetermined threshold, above a predetermined threshold, equal to a desired value, etc.) for at least longer than a threshold time (e.g., a threshold duration of time). In some embodiments, the threshold time is 500 ms. In other embodiments, the controller 402 determines whether all of the auto learn prechecks are met for a time that is less than or greater than 500 ms (e.g., 250 ms, 1 second, 5 seconds, etc.). If one or more of the auto learn prechecks are not met for at least longer than the threshold time, the calibration method 500 continues to step 530. In response to all of the auto learn prechecks being met for at least longer than the threshold time, the calibration method 500 continues to step 535.

At step 530, the controller 402 is configured to provide an alert (e.g., a first indication, a notification, a pop-up message, an audio alert, a flashing light, haptic feedback, etc.) to the operator indicating that one or more of the auto learn prechecks are not met for at least longer than the threshold time. In some embodiments, the alert is provided via the operator interface 40 and/or another component of the vehicle 10 relating to a command to drive the vehicle 10 straight. In some embodiments, the alert includes an indication of which auto learn precheck of the one or more auto learn prechecks that was not met for the threshold time. In some embodiments, in response to a determination that one or more of the auto learn prechecks were not met for at least longer than the threshold time, the controller 402 limits operation of one or more components of the vehicle 10. By way of example, the controller 402 may provide a steering control command to the steering control device 304 to position the front tractive elements 78 or the rear tractive elements 88 straight forward. By way of another example, the controller 402 may provide a command to one or more of the prime movers 52 to drive the front tractive elements 78 or the rear tractive elements 88 at substantially the same rate such that the vehicle 10 travels substantially straight. By way of another example, the controller 402 may provide a signal commanding the driveline 50 to limit the speed of the vehicle 10 below a second threshold speed. In such examples, the second threshold speed may be greater than the first threshold speed (e.g., 20 mph). In some embodiments, in response to a determination that one or more of the auto learn prechecks were not met for at least longer than the threshold time, the controller 402 may set a condition of the vehicle 10 to limit operation of the vehicle 10 in the field mode. In some embodiments, in response to a determination that one or more of the auto learn prechecks were not met for at least longer than the threshold time, a top end of a range of an input to a component of the vehicle 10 (e.g., input to the steering input device 302, an input to the braking system 92, etc.) gives no response to (e.g., provides no influence on) an output generated in response to the received input. By way of example, if the steering input device 302 defines a rotational range of ±180°, any input from the operator beyond a top threshold of the range (e.g., beyond ±150°, beyond ±130°, beyond ±90°, etc.) will not change (e.g., affect, control, etc.) the actual steered angle of the front tractive elements 78 or the rear tractive elements 88 (e.g., the output generated in response to the received input) or the heading of the vehicle 10. In some embodiments, the controller 402 is configured to limit control of one or more other components of the vehicle 10 in response to a determination that one or more of the auto learn prechecks were not met for at least longer than the threshold time. After completing step 530, the calibration method 500 returns to step 520.

In response to a determination that all of the auto learn prechecks are for at least longer than the threshold time at step 525, the calibration method 500 continues to step 535. At step 535, the controller 402 is configured to initiate the auto learn sequence. The auto learn sequence includes recording the operational parameters (e.g., operation characteristics) of the steering control device 304. By way of example, in response to the auto learn sequence being initiated (e.g., AutoLearn=TRUE), the controller 402 records the arm position of the steering cylinder 89 (e.g., a current steering position value) for a predetermined time (e.g., 500 ms, 1 second, etc.) to record a straight position of the steering cylinder 89 (e.g., an operational parameter of the steering control device 304 corresponding to straight travel, a current steering position value corresponding to straight travel, etc.). The auto learn center (e.g., the auto learn center set to the baseline calibration value in step 510) is updated to be set to the operational parameter of the steering control device 304 corresponding to straight travel. Because the operational parameter of the steering control device 304 is being recorded during a straight-line travel of the vehicle 10 and the auto learn center is updated based on ground drive wheel speed and steering wheel position, the calibration of the steering control device 304 (e.g., the steering cylinder 89 position) is much closer to actual straight than the pre-calibrated value of the steering control device 304 as discussed above. In other words, at step 525, the auto learn sequence calibrates (e.g., based on collected data during straight-line operation) the position of the steering cylinder 89 to steer the rear tractive element 88 (e.g., a steered caster) such that the vehicle 10 moves in a straight line when the steering input device 302 is set to a center position corresponding with the straight-line operation.

At step 540, the controller 402 determines, based on the data acquired by the sensors 100, whether to transition the vehicle 10 to the field mode (e.g., the second mode of operation). In other words, the controller 402 may determine whether the surrounding environment or the behavior of the vehicle 10 (e.g., slow speeds, uneven terrain, initiating a plowing procedure, etc.) would warrant controlling the vehicle 10 in the field mode. By way of example, the controller 402 may determine that the vehicle 10 is traveling in a field and may transition the vehicle 10 to the field mode (e.g., that the field mode is advisable, necessary, etc.). In response to a determination that the condition (e.g., field mode) is not warranted, the calibration method 500 continues to step 555. In response to a determination that the condition is warranted, the calibration method 500 continues to step 545.

At step 545, the controller 402 determines whether the condition (e.g., field mode) is active. In response to a determination that the condition is active, the calibration method 500 continues to step 550. In response to a determination that the condition is not active, step 545 is repeated.

At step 550, in response to a determination that the condition is active, the controller 402 is configured to clear the alert (e.g., the first indication) provided at step 530 (e.g., via the operator interface 40 and/or another component of the vehicle 10) providing an indication (e.g., to the operator) to drive the vehicle 10 straight.

At step 555, the controller 402 determines whether one or more of the sensors 100 are operational (e.g., accurate). In some embodiments, the controller 402 is configured to perform one or more calculations to determine whether one or more of the sensors 100 are operational. By way of example, the controller 402 may calculate an absolute value of a difference between the pre-calibrated value of the steering control device 304 and the calibrated value of the steering control device 304 determined in step 530 (e.g., steering cylinder 89 position corresponding to straight travel) and determine whether the result is less than or equal to a predetermined value (e.g., 60 mV, 75 mV, 100 mV, etc.). If the result is less than or equal to the predetermined value (e.g., the sensors 100 are operational), at step 560, the controller 402 is configured to permit unrestricted operation of the vehicle 10. By way of example, the controller 402 may permit operation of the driveline 50 such that the vehicle 10 can travel at a speed (e.g., a maximum speed of the vehicle 10) that is greater than the second threshold speed set in step 530 (e.g., greater than 10 mph, 15 mph, 20 mph, etc.). If the result is greater than the predetermined value, the controller 402 may make a determination that the sensor 100 is not operational (e.g., faulty, improperly functioning, broken, etc.).

In response to a determination that the result is greater than the predetermined value, the calibration method 500 continues to step 565. At step 565, the controller 402 may provide a signal to one or more systems or components of the vehicle 10 relating to an indication of a sensor fault (e.g., an indication that a position sensor of the one or more sensors 100 is faulty). The controller 402 may be further configured to limit operation of one or more components and/or systems of the vehicle 10. By way of example, in response to a determination that the result is greater than the predetermined value, the controller 402 may command the driveline 50 to limit the speed of the vehicle 10 below a threshold speed (e.g., 10 mph, 15 mph, 20 mph, etc.).

At step 570, the controller 402 may determine whether the key is set to an OFF position. In response to a determination that the key is not in the OFF position (e.g., in the ON position), step 570 is repeated. In response to a determination that the key is in the OFF position, the calibration method 500 may return to step 505.

The calibration method 500 of the present disclosure provides various advantages over traditional systems and methods. The calibration method 500 facilitates calibrating the steering system 300 while the vehicle 10 is in operation (e.g., moving, traveling, etc.). By way of example, the calibration method 500 facilitates calibrating a straight-line positioning of the steering control device 304 while the vehicle 10 is in operation. In some embodiments, the calibration method 500 may be performed without notifying the operator of the vehicle 10. By way of example, performing the calibration method 500 will not provide a sensible (e.g., noticeable) difference in the performance, operation, characteristics, etc. of the vehicle 10 to the operator.

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," or "below") are merely used to describe the orientation of various elements in the figures. It should be noted that the orientation of various elements may differ according to other exemplary embodiments, and that such variations are intended to be encompassed by the present disclosure.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures, and which can be accessed by a general purpose or special purpose computer or other machine with a processor. Combinations of the above are also included within the scope of machine-readable media. Machine-executable instructions include, for example, instructions and data which cause a general-purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen, and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

The terms "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application specific integrated circuit (ASIC). The apparatus may also include, in addition to hardware, a code that creates an execution environment for the computer program in question (e.g., a code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing, and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a vehicle, a Global Positioning System (GPS) receiver, etc.). Devices suitable for storing computer program instructions and data include all forms of non-volatile memory, media, and memory devices, including by way of example semiconductor memory devices (e.g., EPROM, EEPROM, and flash memory devices; magnetic disks, e.g., internal hard disks or removable disks; magneto-optical disks; and CD ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user. Other kinds of devices may be used to provide for interaction with a user as well; for example, feedback provided to the user may be any form of sensory feedback (e.g., visual feedback, auditory feedback, or tactile feedback).

Implementations of the subject matter described in this disclosure may be implemented in a computing system that includes a back end component (e.g., as a data server), or that includes a middleware component (e.g., an application server), or that includes a front end component (e.g., a client computer) having a graphical user interface or a web browser through which a user may interact with an implementation of the subject matter described in this disclosure, or any combination of one or more such back end, middleware, or front end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

It is important to note that the construction and arrangement of the vehicle 10 and the systems and components thereof (e.g., the driveline 50, the braking system 92, the control system 96, the steering system 300, the calibration system 502, etc.) as shown in the various exemplary embodiments are illustrative only. Additionally, any element disclosed in one embodiment may be incorporated or utilized with any other embodiment disclosed herein.

What is claimed is:

1. A vehicle system for controlling operation of a vehicle, the vehicle system comprising:

one or more processing circuits configured to:

set a pre-calibrated position value of a steering input device of the vehicle as a center position value, the steering input device configured to receive an input from an operator to steer at least one tractive element of the vehicle;

monitor a precheck condition regarding an operational characteristic of the vehicle associated with a straight-line travel of the vehicle;

control, in response to the precheck condition not being satisfied for a threshold time, an operation of the vehicle; and update, in response to the precheck condition being satisfied for the threshold time, the center position value to be a current steering position value of the steering input device.

2. The vehicle system of claim 1, wherein the precheck condition includes a curvature of the at least one tractive element of the vehicle, and wherein the precheck condition is satisfied when the curvature is within a threshold curvature range.

3. The vehicle system of claim 2, wherein monitoring the curvature of the at least one tractive element includes monitoring an extension distance of a steering control device of the vehicle coupled between the steering input device and the at least one tractive element.

4. The vehicle system of claim 1, wherein the precheck condition includes a steering angle of the steering input device, and wherein the precheck condition is satisfied when the steering angle is within a threshold steering angle range.

5. The vehicle system of claim 1, wherein the precheck condition includes a status of a power-take-off of the vehicle, and wherein the precheck condition is satisfied when the power-take-off is not in operation.

6. The vehicle system of claim 1, wherein the precheck condition includes an autonomous guidance status, and wherein the precheck condition is satisfied when the vehicle is manually steered by the operator.

7. The vehicle system of claim 1, wherein the precheck condition includes a deceleration status, and wherein the precheck condition is satisfied when the vehicle is not in deceleration.

8. The vehicle system of claim 1, wherein the one or more processing circuits are configured to provide, in response to the precheck condition not being satisfied for the threshold time, an indication of the precheck condition not being satisfied.

9. The vehicle system of claim 1, wherein controlling, in response to the precheck condition not being satisfied for the threshold time, the operation of the vehicle includes limiting a speed of the vehicle below a threshold speed.

10. The vehicle system of claim 1, wherein controlling, in response to the precheck condition not being satisfied for the threshold time, the operation of the vehicle includes not generating an output in response to an input at a top end of a range of the input.

11. The vehicle system of claim 1, wherein the at least one tractive element includes a caster wheel configured to engage with a ground surface and wherein the caster wheel is rotatable about an axis of rotation perpendicular to the ground surface.

12. The vehicle system of claim 11, wherein the one or more processing circuits are configured to set the pre-calibrated position value based on a maximum extension distance and a minimum extension distance of a steering control device of the vehicle coupled between the steering input device and the at least one tractive element.

13. The vehicle system of claim 1, wherein the one or more processing circuits are configured to monitor a current speed of the vehicle, and determine whether the current speed is greater than a threshold speed before monitoring the precheck condition.

14. The vehicle system of claim 1, wherein the vehicle is an off-road machine, a tractor, a telehandler, a front loader, a combine harvester, a grape harvester, a forage harvester, a sprayer vehicle, a speedrower, or a windrower.

15. The vehicle system of claim 1, wherein the one or more processing circuits include at least one of (i) a first processing circuit located on the vehicle or (ii) a second processing circuit located remote from the vehicle.

16. A vehicle system comprising:

a vehicle including:
  - a chassis;
  - at least one tractive element coupled to the chassis; and
  - a steering input device coupled with the at least one tractive element and configured to receive an input from an operator to facilitate steering the at least one tractive element; and a control system configured to:
  - set a pre-calibrated position value of the steering input device as a center position value;
  - monitor a precheck condition regarding an operational characteristic of the vehicle associated with a straight-line travel of the vehicle;
  - control, in response to the precheck condition not being satisfied for a threshold time, an operation of the vehicle; and
  - update, in response to the precheck condition being satisfied for the threshold time, the center position value to be a current steering position value of the steering input device.

17. The vehicle system of claim 16, wherein the vehicle includes a steering control device coupled between the steering input device and the at least one tractive element and configured to steer the at least one tractive element responsive to the input from the operator to the steering input device, wherein the precheck condition includes (i) a curvature of the at least one tractive element and (ii) a steering angle of the steering input device, and wherein the precheck condition is satisfied when (i) the curvature is within a threshold curvature range and (ii) the steering angle is within a threshold steering angle range.

18. The vehicle system of claim 16, wherein the vehicle includes a prime mover configured to drive the at least one tractive element, and wherein controlling the operation of the vehicle includes limiting operation of the prime mover such that the vehicle is limited to a speed below a threshold speed.

19. A method for calibrating steering control of a vehicle, the method comprising:

setting a pre-calibrated position value of a steering input device of the vehicle as a center position value, the steering input device configured to receive an input from an operator to steer at least one tractive element of the vehicle;

monitoring a precheck condition regarding an operational characteristic of the vehicle associated with a straight-line travel of the vehicle, the precheck condition including (i) a curvature of the at least one tractive element of the vehicle and (ii) a steering angle of the steering input device;

providing, in response the precheck condition not being satisfied for a threshold time, an indication of the precheck condition not being satisfied;

limiting, in response to the precheck condition not being satisfied for the threshold time, operation of the vehicle to a speed below a threshold speed; and updating, in response to the precheck condition being satisfied for the threshold time, the center position value to be a current steering position value of the steering input device, wherein the precheck condition is satisfied when (i) the curvature is within a threshold curvature range and (ii) the steering angle is within a threshold steering angle range.

20. The method of claim 19, wherein monitoring the curvature of the at least one tractive element includes monitoring an extension distance of a steering control device of the vehicle coupled between the steering input device and the at least one tractive element.

* * * * *